(12) United States Patent
Yang

(10) Patent No.: US 7,007,813 B2
(45) Date of Patent: Mar. 7, 2006

(54) SERVING TRAY WITH FUNCTION OF KEEPING FOOD FRESH

(76) Inventor: Heng-Te Yang, P.O. Box 90, Tainan (TW)

(\*) Notice: Subject to any disclaimer, the term of this patent is extended or adjusted under 35 U.S.C. 154(b) by 243 days.

(21) Appl. No.: 10/676,039

(22) Filed: Oct. 2, 2003

(65) Prior Publication Data

US 2005/0072711 A1    Apr. 7, 2005

(51) Int. Cl.
*A47J 47/00* (2006.01)

(52) U.S. Cl. .................... 211/131.1; 211/126.1; 108/50.12

(58) Field of Classification Search ............. 211/78, 211/85.4, 131.1, 129.1, 163, 126.7, 128.1, 211/126.12, 126.14; 62/457.6, 372; D7/501, D7/540, 553.6; 108/50.12; 206/557, 661, 206/558; 312/238, 305, 135, 408

See application file for complete search history.

(56) References Cited

U.S. PATENT DOCUMENTS

| | | | | |
|---|---|---|---|---|
| 4,953,696 A | * | 9/1990 | Huang et al. | 206/214 |
| 6,378,325 B1 | * | 4/2002 | Yang | 62/457.6 |
| 6,854,608 B1 | * | 2/2005 | McNeeley et al. | 211/78 |
| 2005/0005631 A1 | * | 1/2005 | DeMars | 62/457.6 |

\* cited by examiner

*Primary Examiner*—Blair M. Johnson

(57) ABSTRACT

A serving tray with function of keeping food fresh in the present invention includes a rotary tray provided with at least one compartment; at least one receiving pan; and a base plate disposed below the rotary tray. In using, after a user puts ice cubes into the at least one compartment, places various food items, such as vegetables, fruits or the like, respectively in the at least one receiving pan, and then locates the at least one receiving pan above the at least one compartment, the food items will soon be spread with cool air coming from the ice cubes and penetrating through a plurality of perforated holes of the at least one receiving pan, thus enabling the food items to be kept fresh in cool temperature in a longer period for being tasted more delicious, and maintained with their individual unique flavors in a sanitary condition.

2 Claims, 3 Drawing Sheets

SERVING TRAY WITH FUNCTION OF KEEPING FOOD FRESH

BACKGROUND OF THE INVENTION

1. Field of the Invention

This invention relates to a serving tray with function of keeping food fresh, particularly to one capable of having ice cubes put into compartments of a rotary tray, having various food items, such as vegetables, fruits or the like, respectively placed in different receiving pans without being mixed up, and then having the receiving pans located on the compartments of the rotary tray, by which the food items will soon be spread with cool air coming from the ice cubes and penetrating through a plurality of perforated holes of the receiving pans, thus enabling the food items to be kept fresh in cool temperature in a longer period for being tasted more delicious, and maintained with their individual unique flavors in a sanitary condition.

2. Description of the Prior Art

Generally speaking, a known conventional way of keeping food items, such as vegetables, fruits or the like, fresh in a container is firstly to have ice cubes put into a lower portion of the container, and then have all of the food items placed over the ice cubes. However, in such way, the food items are kept cool and fresh only in a temporary period because the ice cubes that are directly contacted with the food items will soon be melted into water, especially in hot summer days, and accumulated in the container, thus not only mixing all the flavors of the food items together but also reducing the nutriment of the food items. Therefore, the food items are hard to be kept cool and fresh in a longer period in such traditional way. Moreover, worse than all, the food items are liable to become putrefactive in a short time after being continuously soaked in the accumulated water, thus arising serious sanitary problems

SUMMARY OF THE INVENTION

The main purpose of the invention is to offer a serving tray with function of keeping food fresh capable of having various food items held separately without being mixed up, kept fresh in cool temperature in a longer period for being tasted more delicious, and maintained with their individual unique flavors in a sanitary condition.

The main feature of the invention is to provide a serving tray with function of keeping food fresh, mainly including:

a rotary tray provided with at least one compartment disposed therein;

at least one receiving pan capable of being located above the at least one compartment of the rotary tray, and each provided with a plurality of perforated holes arranged on a bottom thereof; and, a base plate disposed below of the rotary tray.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
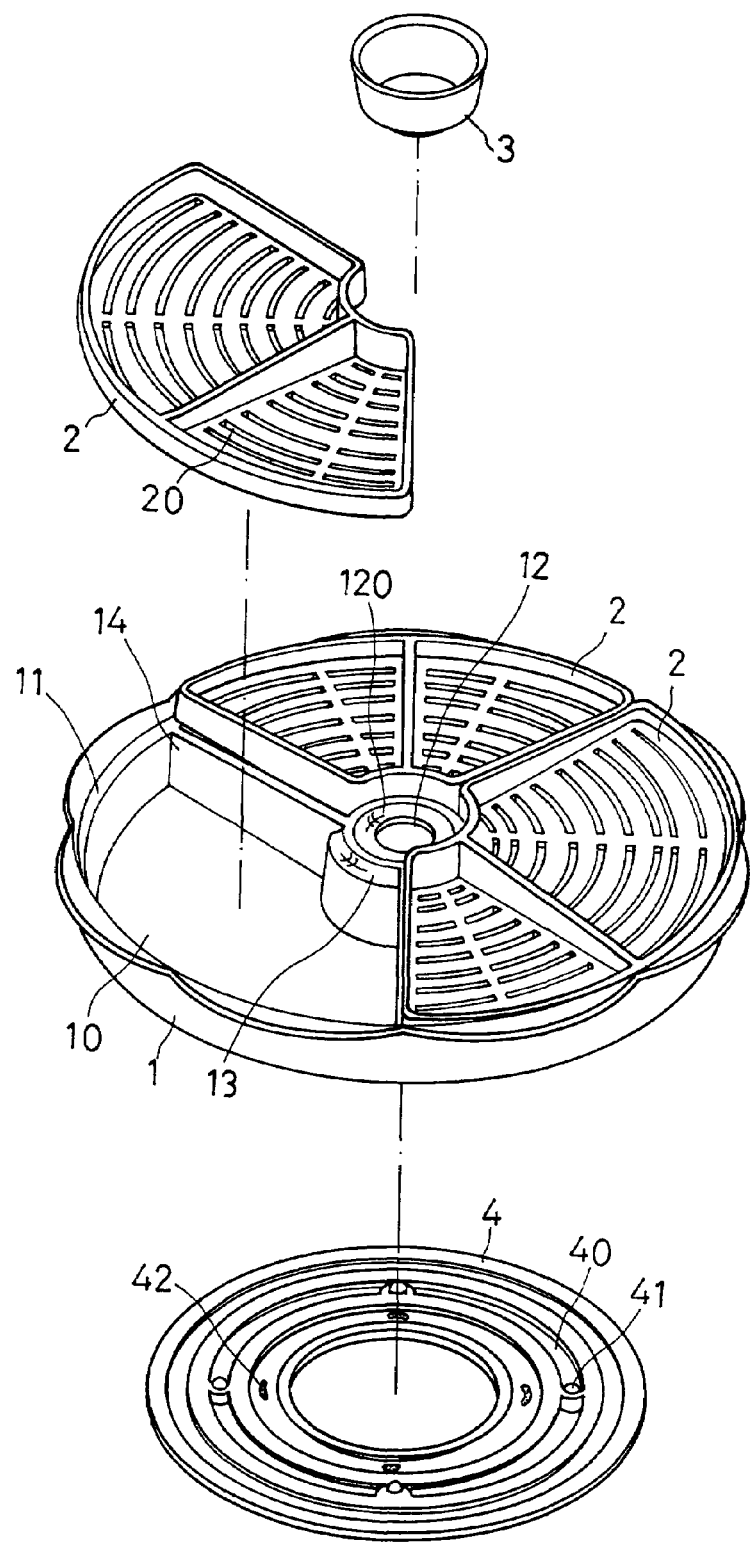
FIG. 1 is an exploded perspective view of a serving tray with function of keeping food fresh in the present invention.
Figure 2:
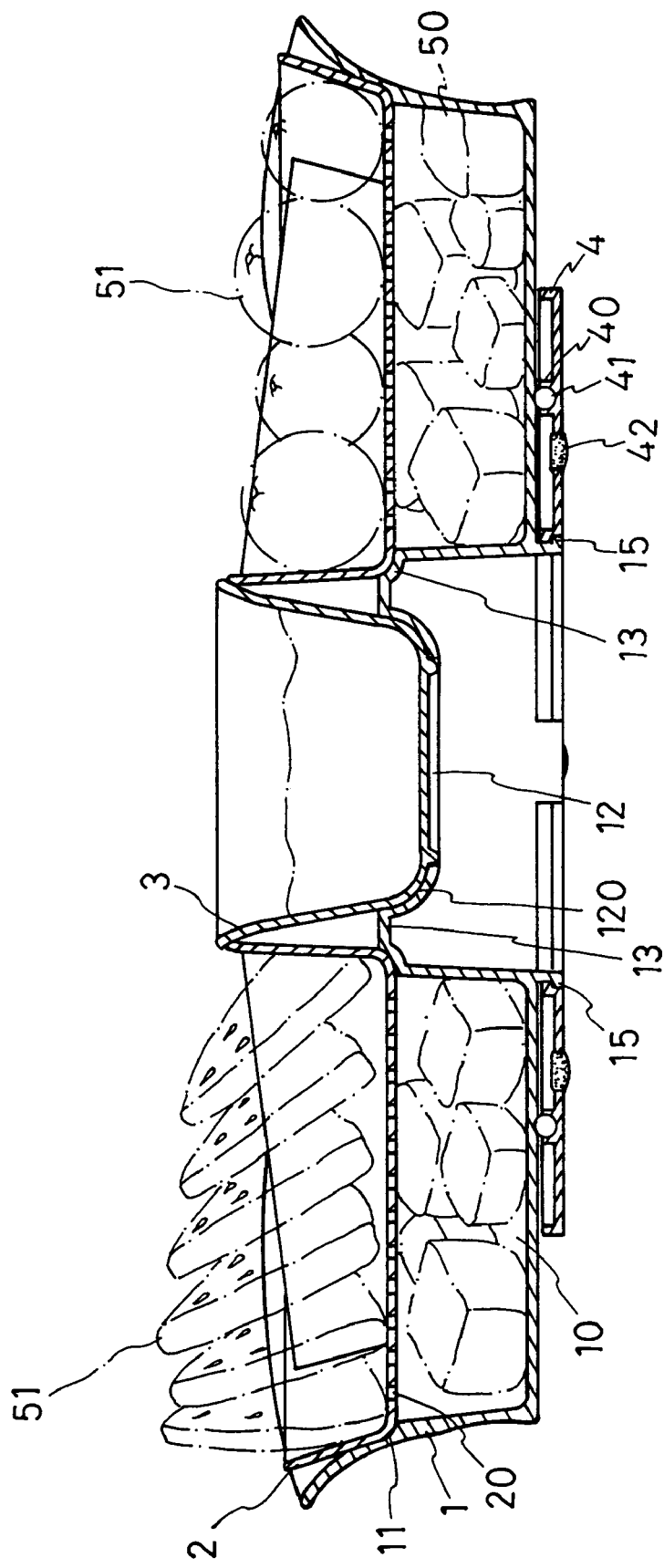
FIG. 2 is a schematic sectional view of the serving tray with function of keeping food fresh in the present invention, showing a first preferred embodiment in use; and, FIG. 3 is a schematic view of the serving tray with function of keeping food fresh in the present invention, showing a second preferred embodiment in use.

A first preferred embodiment of a serving tray with function of keeping food fresh in the present invention, as shown in FIGS. 1 and 2, includes a rotary tray 1, a plurality of receiving pans 2, a condiment vessel 3 and a base plate 4.

The rotary tray 1 has a plurality of compartments 10 disposed in an interior of the rotary tray 1, a supporting edge 11 disposed on an inner wall of a periphery thereof along upper ends of the compartments 10, a through hole 12 disposed in a center thereof, a supporting seat 13 disposed around an exterior of the through hole 12 and connected with the compartments 10, a plurality of partitions 14 disposed therein for dividing the interior of the rotary tray 1 into the compartments 10, and a plurality of hooking members 15 disposed on an external surface of a bottom thereof. The through hole 12 has a supporting flange 120 protruded inwardly from an upper end of an inner wall thereof.

The plurality of receiving pans 2 is capable of being located above the compartments 10 of the rotary tray 1 for being placed with various food items 51, such as vegetables, fruits or the like without being mixed up. The receiving pans 2 can be just rested on the supporting edge 11 and the supporting seat 13 of the rotary tray 1 at peripheral rims of bottoms thereof so that separate hollow spaces are formed between the compartments 10 of the rotary tray 1 and external surfaces of the bottoms of the receiving pans 2. Each of the receiving pans 2 has a plurality of perforated holes 20 arranged on the bottom thereof.

The condiment vessel 3 is capable of being located on the supporting flange 120 of the through hole 12 of the rotary tray 1.

The base plate 4 disposed below the rotary tray 1 and capable of being hooked by the plurality of hook members 15 of the rotary tray 1 has an annular groove 40 disposed thereon, a plurality of balls 41 accommodated in the annular groove 40 and a plurality of plastic positioning pads 42 disposed thereon. Each of the plurality of balls 41 has a top protruded out of the annular groove 40 and contacted with the external surface of the bottom of the rotary tray 1.

Therefore, the rotary tray 1 can be rotated at 360° angle by the hooking of the plurality of hook members 15 of the rotary tray 1 to the base plate 4 and by the contacting of the tops of the plurality of balls 41 with the external surface of the bottom of the rotary tray 1.

In using, referring to FIGS. 1 and 2, firstly place ice cubes 50 respectively in the compartments 10 of the rotary tray 1. Secondly, place various food items 51, such as vegetables, fruits or the like, in the receiving pans 2 without being mixed up. Thirdly, locate the receiving pans 2 above the compartments 10 of the rotary tray 1 with the peripheral rims of the bottoms of the receiving pans 2 just rested on the supporting edge 11 and the supporting seat 13 of the rotary tray 1 so that the receiving pans 2 is limited and separated by the plurality of partitions 14 without following the rotation of the rotary tray 1 to move. Finally, place any condiments in the condiment vessel 3, and then locate the condiment vessel 3 on the supporting flange 120 of the through hole 12 of the rotary tray 1, by which the food items 51 will soon be spread with cool air coming from the ice cubes 50 and penetrating through the plurality of perforated holes 20 of the receiving pans 2 so as to be kept fresh in cool temperature in a longer period.

Moreover, since the food items 51 and the condiments are respectively placed in the receiving pans 2 and the condiment vessel 3, they can maintain their individual unique flavors without being mixed together. Therefore, when a user takes proper amount of the food items 51 from the receiving pans 2 and some of the condiments from the condiment vessel 3 to eat them by dipping or mixing up, they can be tasted more delicious.

Furthermore, after the ice cubes 50 are melted into water, they are only remained in the compartments 10 of the rotary tray 1 without being contacted with the food items 51 directly; therefore, it is not to worry that the food items 51 will not be soaked in the accumulated water and become putrefactive, thus ensuring the food items 51 to be kept fresh in a sanitary condition.

In addition, since the rotary tray 1 can be rotated at 360° angle by the engagement of the base plate 4 with the bottom of the rotary tray 1 and the rolling movements of the plurality of balls 41, the user can take different food items 51 from the receiving pans 2 conveniently only by rotating the rotary tray 1 freely.

Figure 3:
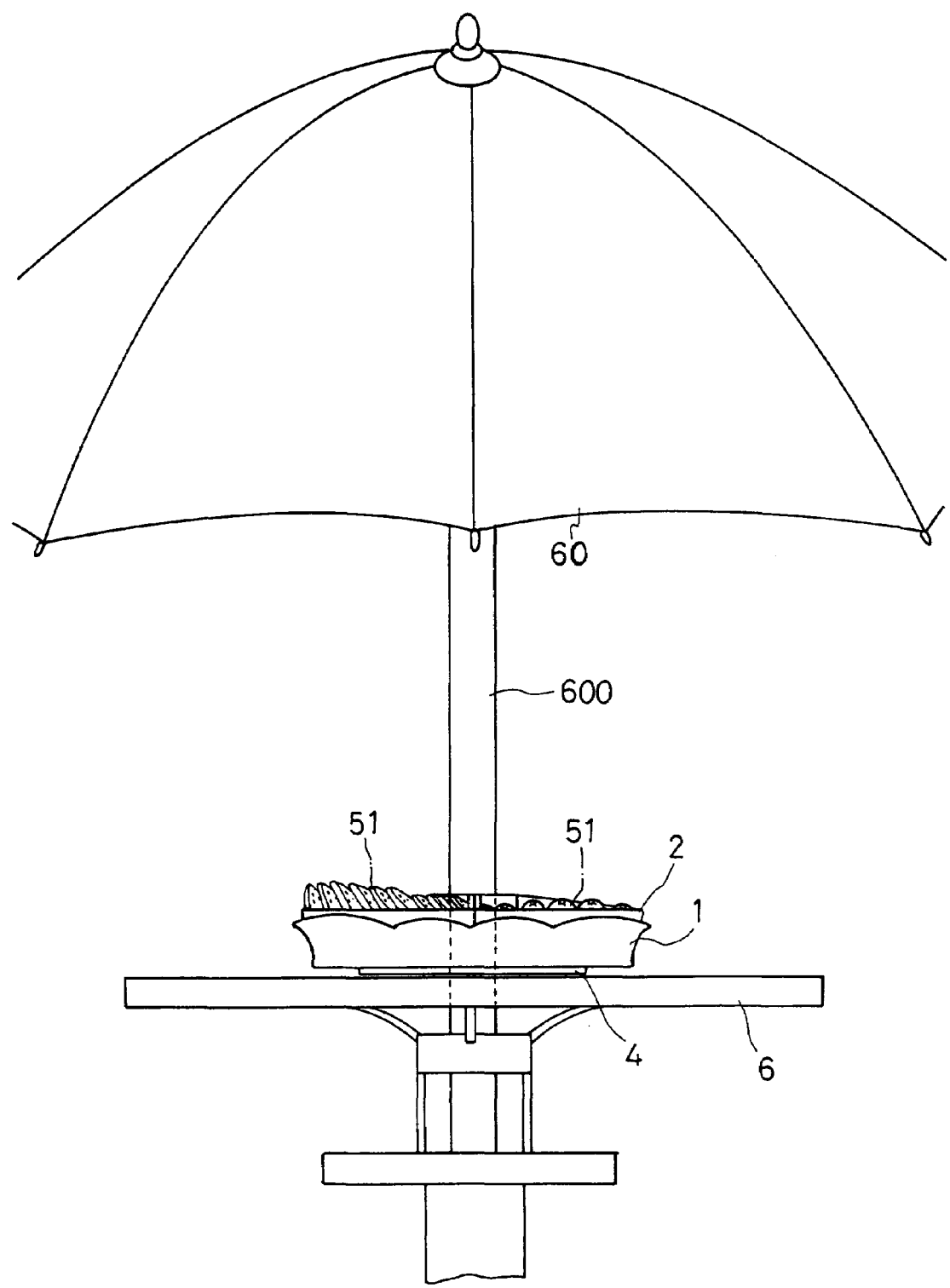

A second preferred embodiment of the serving tray with function of keeping food fresh in the present invention, as shown in FIG. 3, is to have the serving tray of the invention located on an outdoor table 6 with a shank 600 of an umbrella 60 that is erected on the outdoor table 6 passed through the through hole 12 of the rotary tray 1 instead of having the condiment vessel 3 located on the supporting flange 120 of the through hole 12. And then, since the rotary tray 1 can be rotated at 360° angle by the engagement of the base plate 4 with the bottom of the rotary tray 1 and the rolling movements of the plurality of balls 41 in the similar matter as described in the first preferred embodiment, a user can take different food items 51 from the receiving pans 2 conveniently only by rotating the rotary tray 1 freely, thus increasing the pleasure of eating outdoors.

While the preferred embodiments of the invention have various modifications may be made therein and the appended claims are intended to cover all such modifications that may fall within the spirit and scope of the invention.

What is claimed is:

1. A serving tray for keeping food fresh, comprising:
a rotary tray having a plurality of compartments disposed in an interior of the rotary tray, a supporting edge disposed on an inner wall on periphery thereof along upper ends of the compartments a supporting seat on the tray having, a through hole disposed in a center thereof, the supporting seat disposed around an exterior of the through hole and forming a portion of the compartments, a plurality of partitions disposed in the rotary tray for dividing the interior of the rotary tray into the compartments, and a plurality of hooking members disposed on an external surface of a bottom of the rotary tray; the supporting seat having a supporting flange protruded inwardly from an upper end of an inner wall thereof;
a plurality of receiving pans capable of being located above the compartments of the rotary tray for holding various food items; the receiving pans being removably supported by the supporting edge and the supporting seat of the rotary tray at peripheral rims of bottoms thereof so that separate hollow spaces are formed between the compartments of the rotary tray and external surfaces of the bottoms of the receiving pans; each of the receiving pans having a plurality of perforated holes arranged on the bottom thereof,
a condiment vessel being removably supported on the supporting flange of the through hole of the rotary tray;
a base plate disposed below the rotary tray and capable of being hooked by the plurality of hook members of the rotary tray; the base plate having an annular groove disposed thereon, a plurality of balls accommodated in the annular groove and a plurality of plastic positioning pads disposed thereon; each of the plurality of balls having a top protruded out of the annular groove and contacted with the external surface of the bottom of the rotary tray;
wherein the rotary tray is rotatable through 360 degrees by the hooking of the plurality of hook members of the rotary tray to the base plate and by the contacting of the tops of the plurality of balls with the external surface of the bottom of the rotary tray.

2. The serving tray for keeping food fresh as claimed in claim 1, in combination with:
an outdoor table; the serving tray located on the outdoor table with a shank of an umbrella that is erected on the outdoor table passed through the through hole of the rotary tray.

* * * * *